March 13, 1956  P. W. HARLAND ET AL  2,738,497
PANEL MOUNTED CASING CONTAINING SYNCHRO-TRANSFORMER, AMPLIFIER
AND SERVOMOTOR OPERATED INDICATOR
Filed April 24, 1952  5 Sheets-Sheet 1

INVENTORS
PHILIP W. HARLAND
BY JACOB T. KUNZ
Pollard and Johnston
ATTORNEYS

March 13, 1956 P. W. HARLAND ET AL 2,738,497
PANEL MOUNTED CASING CONTAINING SYNCHRO-TRANSFORMER, AMPLIFIER
AND SERVOMOTOR OPERATED INDICATOR
Filed April 24, 1952 5 Sheets-Sheet 5

INVENTORS
PHILIP W. HARLAND
BY JACOB T. KUNZ
Pollard and Johnston
ATTORNEYS ated Mar. 13, 1956

2,738,497

PANEL MOUNTED CASING CONTAINING SYNCHRO-TRANSFORMER, AMPLIFIER, AND SERVOMOTOR OPERATED INDICATOR

Philip W. Harland, Sellersville, and Jacob T. Kunz, North Hills, Pa.; said Harland assignor to American Machine and Metals, Inc., Sellersville, Pa., a corporation of Delaware, and said Kunz assignor to Schulmerich Electronics, Incorporated, Sellersville, Pa., a corporation of Pennsylvania Application April 24, 1952, Serial No. 284,185

15 Claims. (Cl. 340—315)

This invention relates to electrically operated indicating instruments and particularly to a unitary device for indicating a condition remote from the instrument.

Servomechanisms have been employed in conjunction with control and indicating instruments, the error signal being amplified for positioning a servo-motor. In previous servomechanism arrangements, such as those for indicating pressure and the like, the electronic amplifiers have been remotely located relative to the indicating instrument itself. The amplifiers have taken up considerable space and have required many wires for their connections to the instrument so that where numerous instruments have been needed, such as in an airplane, the number and weight of the connecting wires becomes a substantial and objectionable factor. Also, the size and weight of previous instruments has militated against their use in many instances. Another requirement in an accurate instrument is that it be sensitive to small changes in the measured function and respond to these changes without hunting.

One of the objects of the present invention is to provide a unitary servomechanism indicator and amplifier which is small in size and, for example, can be mounted in a small casing directly upon an instrument board or similar panel.

Another object of the invention is to provide a servomechanism indicating arrangement having high sensitivity to small changes in the quantity to be measured or indicated, and yet being adequately damped so as not to overshoot upon large deviations of the measured quantity.

Another object of the invention is to provide an amplifier and indicator combination which will give high torque at small changes in the measured condition and which will have the desired torque at larger deviations.

The invention will be described in conjunction with a pressure indicating device but it is to be understood that it can be used for various purposes and is not limited thereto. For the specific example described, a suitable pressure operated means can be used to produce a signal turning the rotor of a conventional synchro-transmitter. The synchro-transmitter will produce a signal depending upon the relationship of the rotor to the stator windings, an alternating current being supplied to the rotor. A synchro-transformer can be connected to the three phase stator winding of the synchro-transmitter so that similar voltage and phase relationships will exist in the stator windings of the synchro-transformer. A signal will be produced in the rotor winding of the synchro-transformer as is known. This signal is called the "error" signal and it can be fed to a special amplifier circuit which will be described in detail hereafter, the amplifier being constructed and associated with the other parts in a novel manner so that a unitary instrument results.

The amplified signal can be connected to one of the phases of a two phase servo-motor, the other phase of the motor being connected to the aforementioned alternating current supply. The amplifier is arranged to produce a phase shift so that its output signal is displaced relative to the alternating current supply. The servomotor is mechanically connected through a main gear train with the rotor of the synchro-transformer.

The indicator may have a "fine" pointer interposed in the main gear train between the servo-motor and the synchro-transformer, and a single turn or "unit" pointer connected through an auxiliary gear train to the main gear train intermediate the servo-motor and synchro-transformer. The fine pointer indicates fractions of a revolution of the synchro-transformer and the unit pointer indicates the number of turns of the fine pointer. The main gear train is arranged so that there is substantially no back lash or eccentricity therein between the synchro-transformer and the point where the auxiliary gear train is connected thereto, the fit being such as is consistent with the stable operation of the overall system. The auxiliary gear train and/or its connection to the main gear train preferably is fitted relatively loosely. The fit between the servo-motor and the auxiliary train may be loose so that oscillations will not be introduced into the gear train. Additional inertia means can be added to the auxiliary gear train adjacent the servo-motor if needed.

When the synchro-transmitter changes the electrical relationships in the synchro-transformer because of change of position of its rotor and the servo-motor turns in response thereto, the main gear train will be rotated appropriately to re-zero the synchro-transformer rotor. In one form of the invention, at the start of rotation of the main gear train, the inertia of the relatively large auxiliary gear train, which is connected to the main gear train, will not be effective immediately because of the loose fit therebetween. Thus, small changes of pressure or condition will cause operation of the indicating arrangement without involving the inertia in the auxiliary gear train at the very beginning of the movement. However, when large changes or signals are involved, if the servo-motor is given too large an impulse, it will tend to overshoot and thus a damping effect becomes desirable. In the arrangement described, the inertia of the unit pointer or auxiliary gear train will come into play immediately after the initial movement and thus serve to mechanically damp the movement. The specific gear train is described and claimed in copending application Serial No. 284,186, filed April 24, 1952, now Patent No. 2,699,542.

In a preferred form of the invention, the amplifier is arranged so that the phase shift in the amplifier is substantially constant regardless of signal strength, and so that the torque of the servo-motor will be relatively high at small signal strengths. This can be accomplished by including an input transformer operating at maximum flux density and maximum permeability at small error signal input values, together with suitable capacitance in the primary circuit in series therewith. The secondary circuit can have a push-pull amplifier and suitable capacitors in the grid circuits of the amplifier tubes, such being a parallel combination. The components are selected and arranged so that optimum phase shift conditions will exist at small signal strengths as well as with high signal strengths. As will be explained hereafter, the phase shift in the primary circuit will increase as the effective reactance seen by the primary decreases, the latter decreasing as the signal increases. The phase shift in the parallel combination including the secondary reactance and grid circuit will decrease with increased signal strength. The rate of change of phase shift in the primary circuit is made substantially equal to the rate of change in the secondary circuit and because they are opposite to each other as the signal changes, the overall phase shift at the output will be substantially constant.

In a still further aspect, voltage limiting means can be included in the primary circuit.

In a further modification of the amplifier, the circuit can be arranged so that the phase shift will decrease as the error signal increases. This can be accomplished by arranging the parts so that the phase shift decrease of the secondary circuit is greater than the increase, or change, if any, in the primary circuit.

The unitary combination of the invention is arranged so that the amplifier assembly is mounted on the servomechanism assembly and held thereby. The means for assisting in holding the amplifier in assembled relationship to the servomechanism also can be a heat dissipating arrangement which holds the electronic tube. In a preferred form, the heat dissipating means can be arranged so as to engage the synchro-transformer of the indicator arrangement and to hold the amplifier in said assembled relationship.

These and other objects, advantages, and features of the invention will become apparent from the following description and drawings which are merely exemplary.

The instrument will be described particularly in conjunction with its use as a pressure gauge for indicating pressure relations existent at a point remote from the gauge itself, it being understood, however, that it can be used for other purposes.

Figure 8:
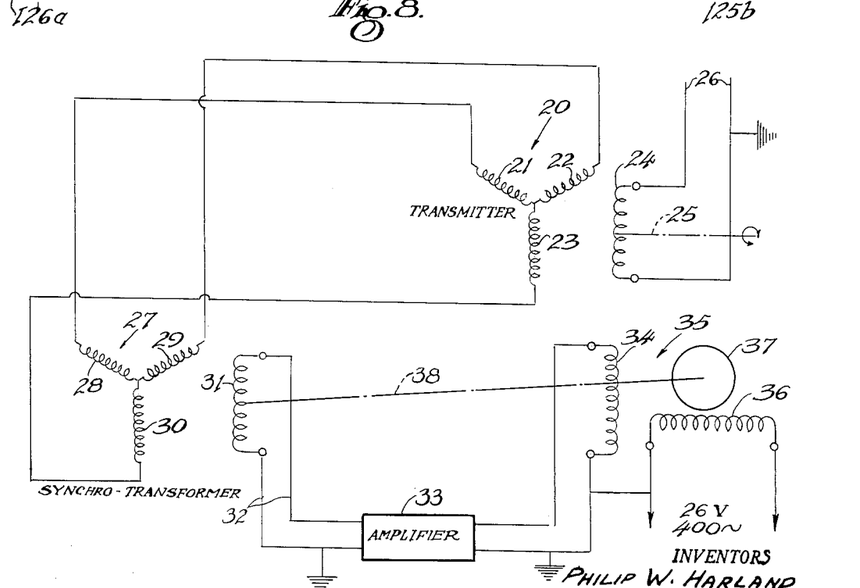
Figure 8 is a schematic wiring diagram of the combination including the synchro-transmitter.

Referring specifically to Fig. 8, the synchro-transmitter or synchro-generator 20 may have three stator windings 21, 22, 23. Rotor winding 24 is diagrammatically indicated as being connected by a shaft or means 25 to a pressure responsive means or other operating mechanism. The rotor winding 24 can be connected, with a suitable alternating current source, for example, a source of 26 volts with a frequency of 400 cycles per second, the voltage and frequency being chosen as desired. Synchro-transformer 27 may have conventional stator windings 28, 29, and 30 respectively connected to windings 21, 22, and 23 of the transmitter. If the rotor winding 31 of the synchro-transformer is not correctly positionally located relative to the rotor winding 24 of the transmitter, a signal will appear across the winding 31 which is connected by leads 32 to amplifier 33. The amplifier will produce an amplified signal in the control phase winding 34 of the two phase servo-motor 35, the amplifier preferably being arranged as described hereafter so that the output signal will be substantially 90° out of phase with the alternating current in winding 36 of the control motor 35, the winding 36 of the control motor 35 preferably being supplied from the same source as the rotor winding 24 of the synchro-transmitter 20. Rotor 37 of the servo-motor 35 is mechanically connected to rotor winding 31 in a suitable manner as indicated schematically by dot-dash line 38, this connection including a mechanical damping arrangement described later and claimed specifically in the aforementioned copending application.

When there is a change in position of rotor winding 24 because of a change in the function being measured, an error signal will be produced in rotor winding 31 of the synchro-transformer, which will produce a control voltage in the control winding 34 of motor 35. This will cause rotor 37 to turn until the signal again becomes zero. At this point, rotor 31 will be in the same relative position to its stator windings as is rotor 24 relative to its stator windings. The servo-motor 37 can be connected to suitable indicating means as will be described at a later point.

One of the main features of the present invention is the arrangement of the parts so that synchro-transformer 27, amplifier 33, and servo-motor 35 can be unitarily assembled in a relatively small casing. Merely by way of example, in one instrument made in accordance with the invention, the casing including the amplifier and servo-mechanism is only about 4" to 6" long and about 1¾" to 2" in diameter. The instrument casing can be constructed so that it may be mounted on an instrument panel, such as on an airplane panel, or can be used in other manners as desired.

The casing 39 (Fig. 1) may be of suitable metal or material, said casing having a transparent window 40 at the front thereof and a suitable flange 41 for mounting on the instrument panel. The combination servomechanism and amplifier is assembled as a unit and then inserted into casing 39.

Figures 1, 16, 17:
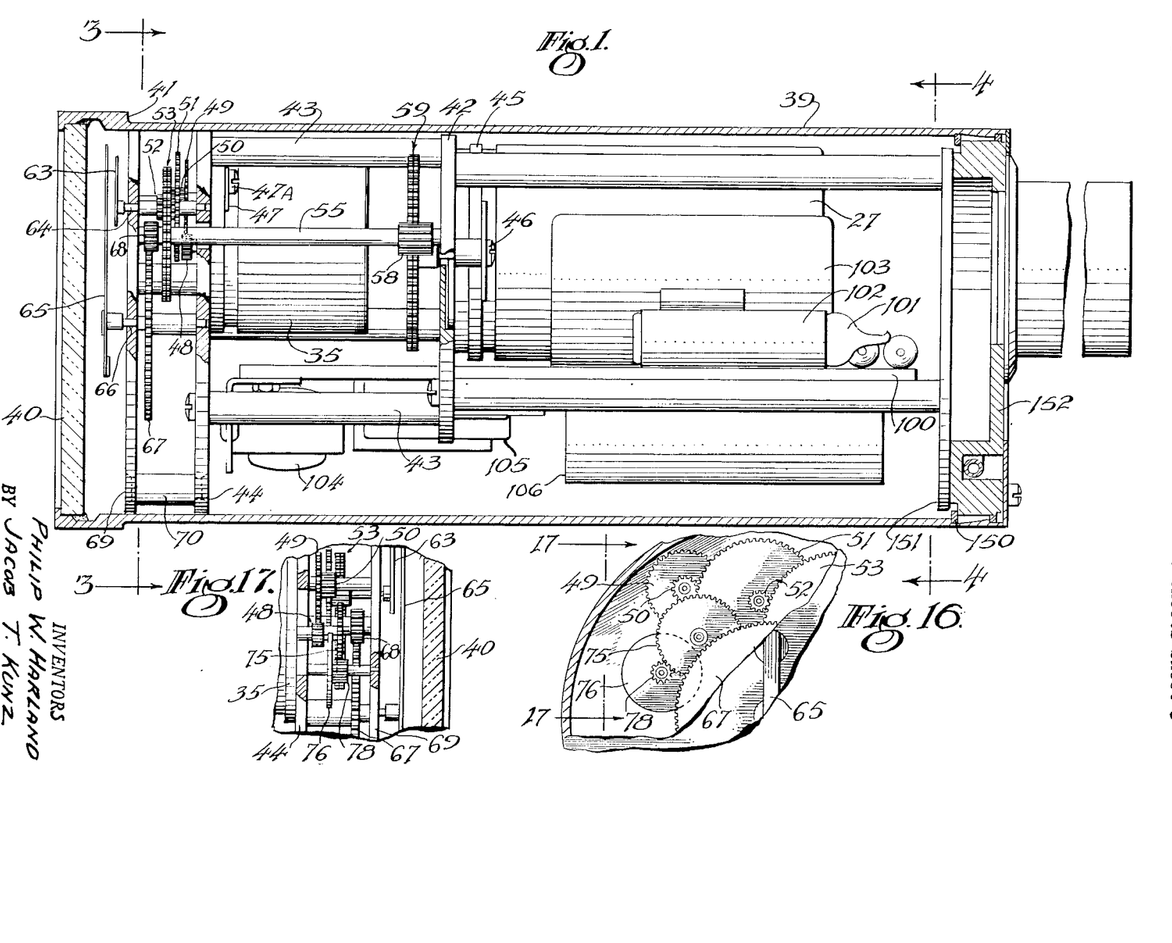
Figure 1 is a view partially in section of one form of the instrument, the view being approximately twice the full size of an instrument made in accordance with the invention.
Figure 16 is a fragmentary view looking in the same direction as Figure 3 of a modification showing an added inertia means.
Figure 17 is a fragmentary view looking in the direction 17—17 of Figure 16.

Synchro-transformer 27 can be carried by mounting plate 42 which is suitably fastened by means of spacer bolts or elements 43 to the movement plate 44. Any type of clamping means 45 and screws 46 can be employed to hold the synchro-transformer 27 in position on the synchro-transformer mounting plate 42. Servo-motor casing 35 can be mounted on movement plate 44 by means of clamps 47 and clamping screws 47A.

As will be described hereafter, the amplifier assembly is mounted on the servomechanism so as to form a unitary assembly of relatively small size.

First, the mechanical connections between the synchro-transformer and the servo-motor will be described. The main gear train from the servo-motor 35 may be traced from pinion 48 (Fig. 2) attached to the rotor of servo-motor 35, through gear 49, pinion 50, gear 51, pinion 52, to split gear 53.

Figures 2, 3, 4:
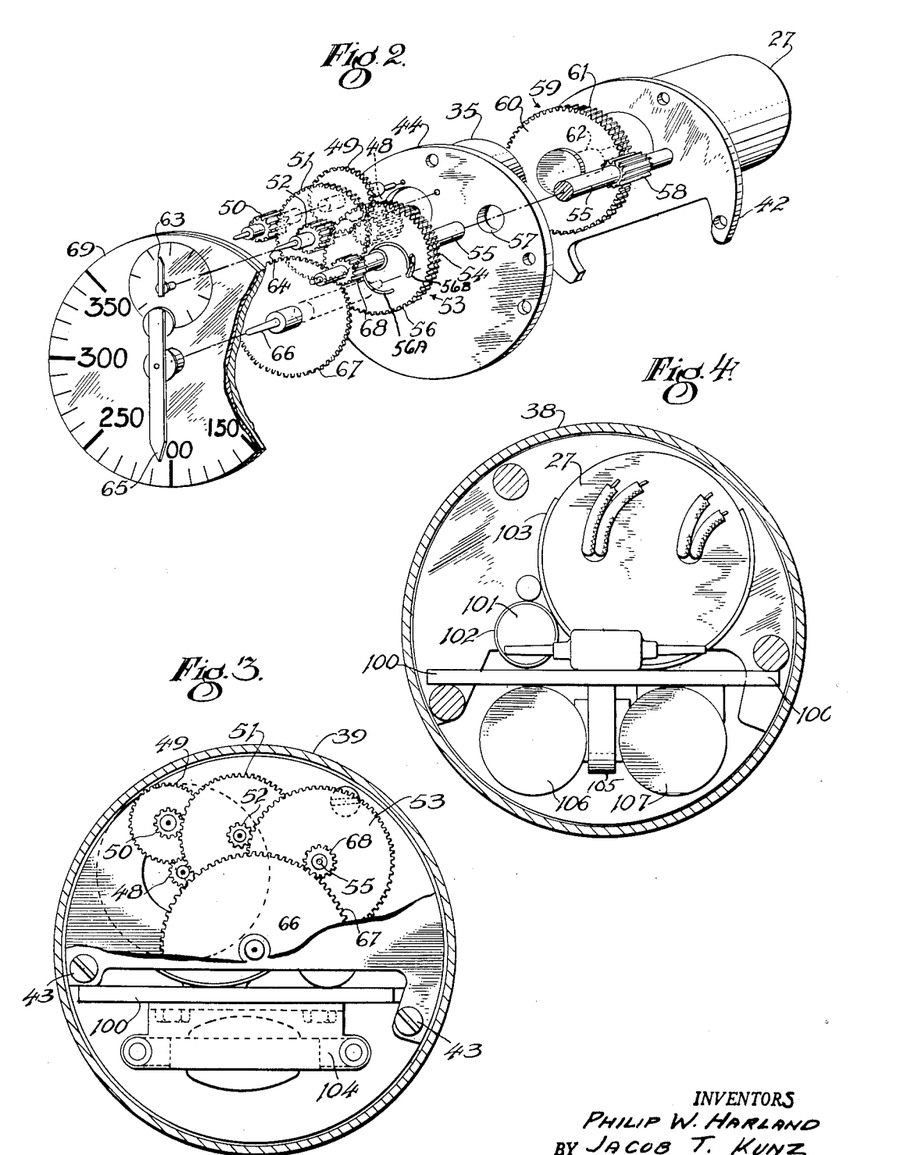
Figure 2 is a fragmentary exploded perspective view of the instrument showing the relationship of the gears and parts.
Figure 3 is a view taken generally along the line 3—3 of Figure 1, the lower portion being broken away.
Figure 4 is a view taken along the line 4—4 of Figure 1.

Split gear 53 is arranged so that one half 54 of the gear 53 is connected to shaft 55, the other half 56 of the split gear being loosely mounted on shaft 55. A spring arrangement 56A is attached to gear 56, is wound at least once around shaft 55, the spring passing loosely through aperture 56B, and being attached to gear 54. The spring means tends to rotate gear parts 54 and 56 relative to each other and thus maintain a tight fit of the gear 53 with pinion 52. Because of the arrangement shown, the spring characteristics will not be affected by rotational forces.

Shaft 55 is shown broken in the exploded view of Fig. 2, the shaft passing through aperture 57 of movement plate 44, pinion 58 being mounted on shaft 55.

A second split gear 59 is mounted on the synchro-transformer rotor shaft 62, the gear assembly having two parts 60 and 61 similar to split gear 53, the spring being omitted for clarity.

The gears and pinions in the main gear train just described preferably are accurately made so that there is substantially no back lash and/or eccentricity in the main gear train connecting the synchro-transformer motor shafts and the auxiliary gear train mentioned hereafter. The fine pointer 63 is attached to shaft 64 connected to the main gear train.

An auxiliary or inertia gear train is used for driving the unit pointer 65, the unit pointer 65 being connected to shaft 66 upon which is mounted auxiliary gear 67. Auxiliary gear 67 is driven by pinion 68 on the main gear train shaft 55, the fit between the auxiliary gear 67 and pinion 68 being relatively loose so that there may be a slight movement of pinion 68 before gear 67 is rotated thereby. Thus, the inertia of auxiliary gear 67 and the unit pointer 65 does not affect the initial movement of the servo-motor as it turns the fine pointer 53 to re-zero the rotor of the synchro-transformer 27.

Changes can be made in the gear ratios so as to obtain the required movement of the pointers or hands and the desired relationship of the fine pointer and unit pointer. A suitable dial 69 (Figs. 1, 2) can be mounted on movement plate 44 by conventional columns or screws 70. The glass 40 can be held in the casing in a conventional manner.

The amplifier construction and its mechanical relation to the servomechanism now will be described, the electrical details being set forth later, the amplifier being mounted on plate means 100. The plate 100 may have wiring formed thereon by etching. In the etched type, a conductive coating is placed on the plate and the circuit etched. Alternatively, a printed circuit can be used, or other suitable wiring means employed.

Figure 5:
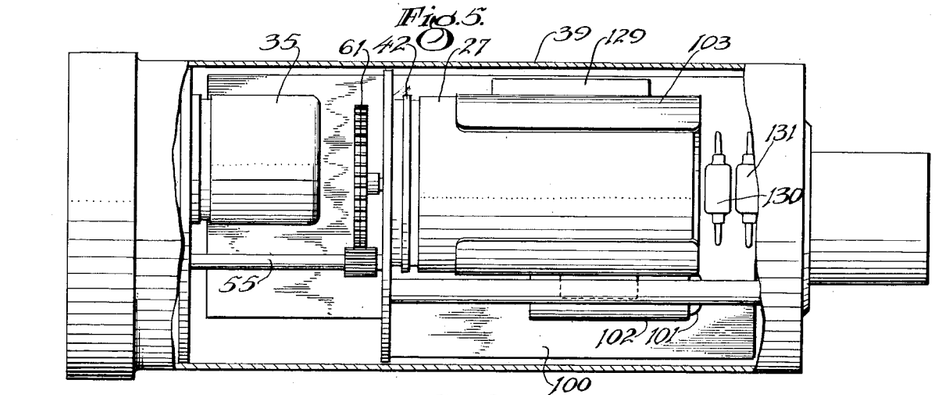
Figure 5 is a top view of figure 1, the figure being reduced in size relative thereto.
Figure 6:
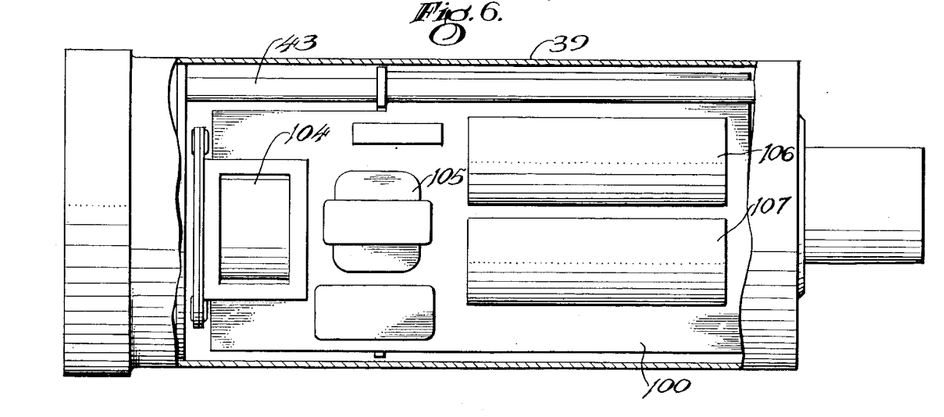
Figure 6 is a bottom view of Figure 1, the figure being reduced in size as in Figure 5.

One of the problems in an amplifier for use in a small instrument casing is that of heat dissipation. A high step-up input transformer is used in the present arrangement. In a preferred aspect, a single double purpose electronic tube 101 (Figs. 1, 4, 5) can be mounted in a shield or holder 102, said shield being integrally fastened to clamp 103, clamp 103 being fastened to base plate 100. Clamp 103 is arranged so that it can closely engage the casing of synchro-transformer 27 and hold the plate 100 and its respective parts in place relative to the servomechanism. Clamp 103 both positions the elements relative to each other and also serves as a heat dissipating means for the electronic tube. Thus, the parts can be arranged to meet the space limitations.

Input transformer 104, output transformer 105, and condensers 106, 107, can be supported from the under portion of plate 100. Rectifiers 140 and 141 and holding shield 103 can be on the other side of plate 100. Other elements of the circuit are mounted on the plate 100 and connected to the other parts. It is to be understood that the parts can be arranged in various manners on the base plate as needed.

Figures 7, 13, 14:
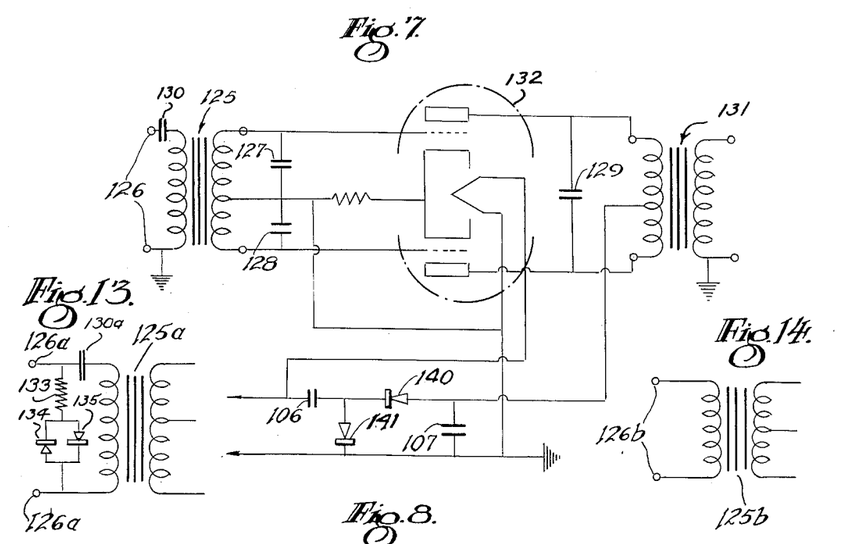
Figure 7 is a schematic wiring diagram of one form of amplifier circuit which can be used.
Figure 13 is a schematic wiring diagram of a modification of the primary circuit of Figure 7.
Figure 14 is a still further modification of the primary circuit of Figure 7.

Figure 7 illustrates a circuit diagram of an amplifier useful in the present invention in combination with the servomechanism previously described. Input transformer 125 (Fig. 7), corresponding to 104, may have its input leads 126 connected to rotor winding 31 (Fig. 8) of the synchro-transformer. The input transformer 125 is designed so that it saturates or loses inductance as the input voltage is increased. The input transformer has a high step-up ratio to provide voltage amplification in the order of 60. Space limitations dictate that the maximum self impedance of the primary be in the order of 600 ohms at low signal voltage. The inductance or self impedance in the primary becomes less as the signal voltage increases.

Figure 11:
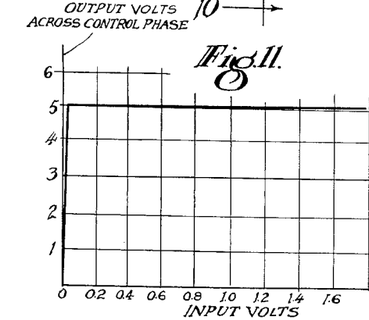
Figure 11 is a graph showing an ideal relationship between output volts and input volts in the amplifier illustrated in Figure 7.

The characteristics of an ideal amplifier suitable for use in the invention are illustrated in Figure 11, wherein it can be seen that maximum output voltage should be delivered at substantially the instant an infinitesimally small error signal is applied to the input of the amplifier.

The primary circuit with condenser 130 and the transformer secondary circuit with the plate circuits of the push-pull amplifier may have condensers 127, 128, 129 and 130 selected so as to provide approximately 90° phase shift between the fixed and control phases of the two phase servo-motor. Input transformer 125 is connected to the grids of the double purpose tube 132 corresponding to tube 101 of Figs. 1, 4, and 5. The plate circuits of tube 132 are connected to the output transformer 131 corresponding to transformer 105.

The phase shift in the arrangement of Fig. 7 is substantially constant at all signal strengths and can be said to occur in these major portions of the circuit:
1. Input transformer (125) primary circuit
2. Grid circuit of tubes
3. Plate circuit of tubes The primary circuit phase shift is developed in the series arrangement of the capacitor 130 and the reactance which appears across the primary. The transformer iron core begins to saturate upon increase of signal. Also, the tubes will start to draw grid current. As a result, the effective reactance seen by the primary will decrease as the signal increases. The capacitor does not change and thus the phase shift in the primary circuit will increase as the signal increases.

The phase shift in the grid circuit is developed in the parallel arrangement of condensers 127 and 128, the transformer secondary reactance, and the grid circuit resistance. The secondary reactance and the grid circuit resistance both decrease as the signal increases so that the phase shift of the parallel combination decreases with signal increase. The same phase shift decrease takes place in the plate circuit condenser and the output transformer (131) reactance.

The components are arranged so that the rate of change of phase shift with applied signal voltage across the primary is equal to rate of change of phase shift with applied signal voltage due to the grid and plate circuits of the tubes. Inasmuch as these phase shifts are in opposite directions, the overall phase shift will be substantially constant. The phase shift will be substantially constant when the signal strength is about .05 volt. As is known, when the phase difference between the phases of a two phase servo-motor is constant, the speed of the motor increases with applied voltage. Accordingly, to adequately damp the system, the maximum voltage applied to the motor must be controlled. To accomplish this, prior art systems have usually saturated the tubes in the amplifier with the result that plate dissipation of the tubes becomes excessive, thus producing high operating temperatures. Where system components are to be assembled in a small casing, such as herein disclosed, excessive plate dissipation and high operating temperatures producing "hot spots" can not be tolerated. By the use of the saturable input transformer described above, the output voltage produced by the synchro-transformer is limited, due to saturation of the core of the input transformer. The combined losses in the control transformer and the input transformer limits the voltage applied to the tubes and hence prevents their plate dissipation from becoming excessive. Thus, operating temperatures are minimized and "hot spots" avoided so that the system components can be arranged in a small unitary assembly such as described.

Figure 12:
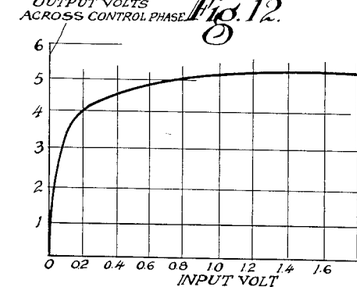
Figure 12 shows an actual relationship of output and input volts of an amplifier made in accordance with Figure 7.

Merely by way of example, Fig. 12 shows the approximate relation of input voltage to output voltage of an amplifier made in accordance with Fig. 7.

In the modification illustrated in Fig. 13, a voltage limiting circuit can be added to the arrangement of Fig. 7, the transformer 125a and condenser 130a corresponding to those of Fig. 7. Resistance 133 can be connected in series with diode rectifier elements 134, 135, to limit the maximum voltage applied to the primary of 125a and thus to the tubes. This will reduce the current in the primary circuit and the grid current in the tubes.

In this instance, the rectifiers are being employed as voltage sensitive resistors. At low voltages, such as of the order of .5 to .75 volt, the forward or positive resistance is of the order of 500 to 200 ohms. This latter value decreases with applied positive volts to the order of 50 ohms with 2 to 3 volts applied. The resistance 133 will limit the current through the diodes and the minimum resistance developed with maximum positive applied volts.

The effect of the diode limiter just described for Fig. 13 also can be obtained partially by making the reactance of capacitor 130 of Fig. 7, high with respect to the reactance of the primary of 125 at high signal levels. Such, however, will result in decreased overall amplification with a given transformer size and given phase shift in the system.

Merely by way of example, condensers 127 and 128 can be 1320 mmfd., and condenser 129, .01 mfd. Condenser 130 can be 1 mfd. and resistance 133 can be 50 ohms. These values are merely illustrative.

Figure 15:
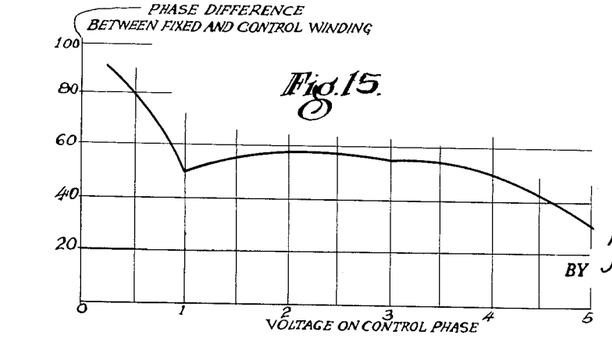
Figure 15 is a graph showing the relationship between the phase difference and the voltage applied to the control phase of the servo-motor of the amplifier of Figure 14.

In another form of amplifier, as seen in Figure 14, the condenser 130 can be omitted so as to cause a phase shift decrease as the voltage of the signal decreases. In such an arrangement, as the input voltage increases, the phase shift decreases as can be seen in Figure 15. This is because the input transformer operates at maximum flux density and maximum permeability, when for example, approximately 0.5 volt is applied to the primary. As a result, the inductance is maximum at this time and the phase shift will be maximum. Because of the absence of the capacitor 130, or equivalent arrangement, the rate of change of phase shift can be such as to have an overall decrease in phase shift as the signal level increases. As is known, the torque delivered by a two phase control motor of the type involved is maximum at a 90° phase difference between the windings and is decreased as the phase shift varies from 90°. Thus, the phase shift can be changed over the operating range of the servo-motor. To further assist in damping, if such becomes necessary, additional inertia means can be employed.

Figures 16 and 17 are fragmentary views wherein parts identical to the previously described arrangement have been given the same numbers. Gear 75 has been added to the servo-motor shaft upon which pinion 48 is mounted. Gear 75 meshes with pinion 78 which in turn drives inertia disc 76. Merely by way of example, the ratio of the pinion 78 to gear 75 can be 1:4 so that weight 76 will turn four times as fast as the servo-motor.

The servo-motor can, for example, turn at 7,000 R. P. M. at no load so that the force required to accelerate the pinion shaft and weight 76 at such a high R. P. M. will effectively damp rapid oscillations of the pointer caused by fluctuation in pressure. Yet when a large signal is impressed on the servo-motor for a relatively long period of time, the inertia disc will reach normal speed and except for the frictional drag of the pinion, will not affect operation.

The auxiliary gear train functions in the same manner as previously described and its inertia will not affect the system at the instant that movement starts.

Figure 9:
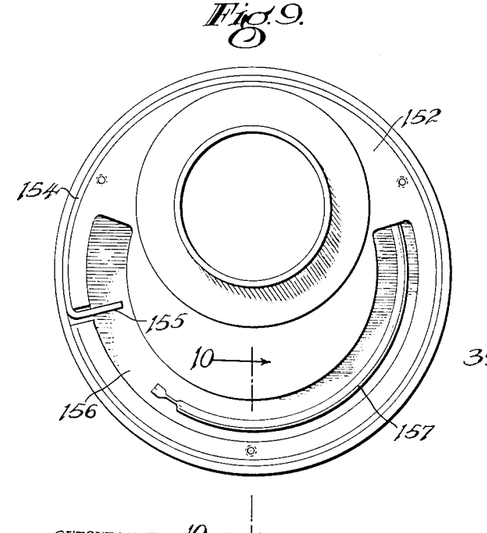
Figure 9 is an end view of Figure 1 looking from the right showing a casing seal arrangement, the outer cover being removed.
Figure 10:
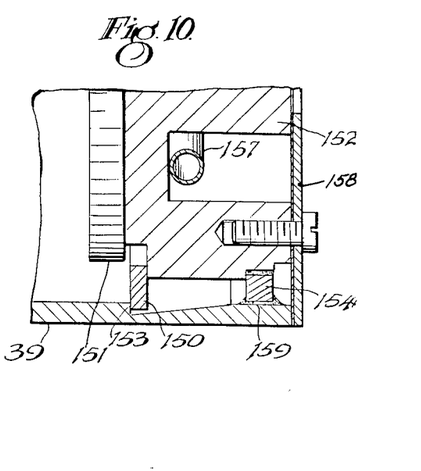
Figure 10 is an enlarged fragmentary view taken along the line 10—10 of Figure 9.

It is desirable to be able to assemble the servomechanism and related amplifier parts into a casing which can be hermetically sealed. One manner of accomplishing this is to provide an expandable ring 150 (Figs. 1, 9, 10) between the back plate 151 and the back cover 152.

The casing 39, which may be of aluminum, brass, or other suitable material, may have a portion 159 coated with a ring of solder. This may be accomplished by electro tin plating the end of the case and cutting away the tin except the ring adjacent the outside of the casing.

The parts then are assembled so that expanding ring 150 will locate the assembly longitudinally in the casing, ring 150 coming upon against shoulder 153 of casing 39. A tear wire 154 then is inserted in the opening between the end plate 152 and the side walls of casing 39. The end 155 of the tear wire can be bent inwardly and into the trough 156 in end plate 152. The ring preferably is a square wire and can be made of stainless steel which has been tin plated and tin dipped. Solder then is applied to the end annular opening and a seal will result. Following this, the evacuating tube or pipe 157 can be connected to suitable apparatus to evacuate the interior of the instrument or to place an inert gas therein, the tube then being suitably sealed and folded into the recess 156. A removable cover plate 158 can be used to cover the end of the casing, a gasket being located under the cover plate.

When it becomes necessary to disassemble the instrument, the end of the wire 154 may be gripped with pliers and heat applied to the sharp bend in the wire so that it can be pulled out by shearing through the solder.

It is to be understood that variations may be made in the details. The unit pointer need not be used, other circuit elements can be used to reach the same results, and the invention can be used for various instruments. Thus, the means for carrying out the invention can be varied in details without departing from the spirit of the invention except as defined in the appended claims.

What is claimed is:

1. In a unitary condition indicator of relatively small size adapted to be mounted on a panel, the combination including a casing having means for mounting the same on a panel or the like, frame means removably mounted in said casing, indicator means mounted on said frame means, a synchro-transformer mechanism mounted on said frame means and having a rotor from which an error signal can be produced in response to a change in the condition being indicated, a servo-motor mechanism mounted on said frame means and mechanically connected to said rotor and said indicator means, an electronic amplifier having a plurality of parts included therein and arranged to electrically connect said rotor and said servo-motor mechanism for amplifying said error signal and thereby operating said servo-motor mechanism, and plate means mechanically connected to one of said mechanisms for mounting said amplifier parts thereon, said plate means further having connecting means formed thereon for electrically interconnecting at least the parts of said amplifier.

2. In a unitary condition indicator adapted to be mounted on a panel, the combination including a casing having means for mounting the same on a panel or the like, said casing having a length in the range of 4″ to 6″ and cross-sectional width of the range of 1¾″ to 2″, frame means removably mounted in said casing, indicator means mounted on said frame means, a synchro-transformer mechanism mounted on said frame means and having a rotor from which an error signal can be produced in response to a change in the condition being indicated, a servo-motor mechanism mounted on said frame means and mechanically connected to said rotor and said indicator means, an electronic amplifier having a plurality of parts included therein and arranged to electrically connect said rotor and said servo-motor mechanism for amplifying said error signal and thereby operating said servo-motor mechanism, and plate means mechanically connected to one of said mechanisms for mounting said amplifier parts thereon, said plate means further having wire means etched thereon for electrically interconnecting at least the parts of said amplifier.

3. In a condition indicator adapted to be mounted on a panel, the combination including a casing having means for mounting the same on a panel or the like, a driven indicator carried in said casing, a synchro-transformer mounted in said casing and having a rotor from which an error signal can be produced in response to a change in condition, a servo-motor mechanically connected to the rotor of said synchro-transformer and to said indicator, an electronic amplifier in said casing electrically connected between said synchro-transformer and said servo-motor for amplifying an error signal from said synchro-transformer and operating said servo-motor and said indicator thereby, said amplifier including a high step-up transformer operating at substantially maximum flux density and maximum permeability with low signal strength, the transformer becoming saturated upon increase of signal strength, and frame means insertable in said casing carrying said indicator, synchro-transformer, servo-motor and amplifier.

4. In an indicator adapted to be mounted on a panel, the combination including a casing having means for mounting the same on a panel or the like, a driven indicator in said casing, a synchro-transformer mechanism in said casing and having a rotor from which an error signal can be produced in response to a change in condition, a servo-motor mechanism mechanically connected to the rotor of said synchro-transformer mechanism and to said indicator, an electronic amplifier having tube means in said casing electrically connected between said synchro-transformer mechanism and said servo-motor mechanism for amplifying an error signal from said synchro-transformer mechanism and operating said servo-motor mechanism and said indicator thereby, and an amplifier holding clip means engaging one of said mechanisms and carrying the tube means of said amplifier, said holding clip means being arranged in heat dissipating relationship with said tube.

5. In an indicator adapted to be mounted on a panel, the combination including a casing having means for mounting the same on a panel or the like, a driven indicator carried by said casing, a synchro-transformer mechanism in said casing having a rotor from which an error signal can be produced in response to a change in condition, a servo-motor mechanism mechanically connected to the rotor of said synchro-transformer and to said indicator, an electronic amplifier having tube means in said casing electrically connected between said synchro-transformer mechanism and said servo-motor mechanism for amplifying an error signal from said synchro-transformer mechanism and operating said servo-motor mechanism and said indicator thereby, said amplifier being mounted on a supporting plate and having an input transformer operating at substantially maximum flux density and permeability at low error signal level, and amplifier holding means connected to said amplifier engaging one of said mechanisms and also enclosing the tube means of said amplifier, said holding means being connected to said plate and being arranged in heat dissipating relationship with said tube.

6. In a condition indicator adapted to be mounted on a panel, the combination including a casing having means for mounting the same on a panel or the like, a servomechanism driven indicator mounted in said casing, a synchro-transformer having a rotor in said casing from which an error signal can be produced in response to a change in condition, a two phase servo-motor mechanically connected to the rotor of said synchro-transformer and to said indicator, and an electronic amplifier in said casing electrically connected between said synchro-transformer and said servo-motor for amplifying an error signal from said synchro-transformer and operating said servo-motor and said indicator thereby, said amplifier having means including an input transformer operating at substantially maximum flux density and permeability at low signal strengths, said input transformer saturating as the signal level increases, producing an optimum phase shift signal at low error signals being fed to said two phase servo-motor.

7. In a condition indicator adapted to be mounted on a panel, the combination including a casing having means for mounting the same on a panel or the like, a servo-mechanism driven indicator in said casing, a synchro-transformer in said casing having a rotor from which an error signal can be produced in response to a change in condition, a two phase servo-motor mechanically connected to the rotor of said synchro-transformer and to said indicator, and an electronic amplifier in said casing electrically connected between said synchro-transformer and said servo-motor for amplifying an error signal from said synchro-transformer and operating said servo-motor and said indicator thereby, said amplifier having means maintaining substantially constant phase shift independent of changes in signal strength above about .05 volts input.

8. In a condition indicator adapted to be mounted on a panel, the combination including a casing having means for mounting the same on a panel or the like, a servo-mechanism driven indicator in said casing, a synchro-transformer in said casing having a rotor from which an error signal can be produced in response to a change in condition, a two phase servo-motor mechanically connected to the rotor of said synchro-transformer and to said indicator, and an electronic amplifier in said casing electrically connected between said synchro-transformer and said servo-motor for amplifying an error signal from said synchro-transformer and operating said servo-motor and said indicator thereby, said amplifier having input transformer means and including phase shift increasing means in the primary circuit upon increase of signal strength and phase shift decreasing means in the secondary of said input transformer means upon increase of signal strength.

9. In a condition indicator adapted to be mounted on a panel, the combination including a casing having means for mounting the same on a panel or the like, a servo-mechanism driven indicator in said casing, a synchro-transformer in said casing having a rotor from which an error signal can be produced in response to a change in condition, a two phase servo-motor mechanically connected to the rotor of said synchro-transformer and said indicator, and an electronic amplifier in said casing connected between said synchro-transformer and said servo-motor for amplifying an error signal from said synchro-transformer and operating said servo-motor and said indicator thereby, said amplifier having input transformer means operating at substantially maximum flux density and permeability at low signal strength, said transformer saturating as the signal strength increases, and including phase shift increasing means in the primary circuit upon increase of signal strength and phase shift decreasing means in the secondary of said input transformer means upon increase of signal strength.

10. In a condition indicator adapted to be mounted on a panel, the combination including a casing having means for mounting the same on a panel or the like, a frame in said casing, a servomechanism driven indicator in said casing, a synchro-transformer mechanism having a rotor in said casing from which an error signal can be produced in response to a change in condition, a servo-motor mechanism mechanically connected to the rotor of said synchro-transformer by a gear train, said indicator and mechanisms being carried by said frame, an electronic amplifier having tube means in said casing connected between said synchro-transformer mechanism and said servo-motor mechanism for amplifying an error signal from said synchro-transformer and operating said servo-motor mechanism and said indicator thereby, said amplifier including a transformer operating above its saturation point upon increase in signal level above low level, means holding said indicator and gear train, plate holding means upon which said amplifier is mounted, heat dissipating means shielding said tube and also engaging one of said mechanisms holding said parts including said plate in assembled relationship on said frame, said frame means being insertable into said casing.

11. In a condition indicator adapted to be mounted on a panel, the combination including a casing having means for mounting the same on a panel or the like, a servomechanism driven indicator in said casing, a synchro-transformer having a rotor in said casing from which an error signal can be produced in response to a change in condition, a two phase servo-motor mechanically connected to the rotor of said synchro-transformer and to said indicator, and an electronic amplifier in said casing connected between said synchro-transformer and said servo-motor for amplifying an error signal from said synchro-transformer and operating said servo-motor and said indicator thereby, said amplifier having means including an input transformer operating at substantially maximum flux density and permeability at low signal strengths, said input transformer saturating as the signal level increases, and means limiting the voltage applied to the input of said input transformer.

12. In a condition indicator adapted to be mounted on a panel, the combination including a casing having means for mounting the same on a panel or the like, a servomechanism driven indicator in said casing, a synchro-transformer having a rotor in said casing from which an error signal can be produced in response to a change in condition, a two phase servo-motor mechanically connected to the rotor of said synchro-transformer and to said indicator, and an electronic amplifier in said casing connected between said synchro-transformer and said servo-motor for amplifying an error signal from said synchro-transformer and operating said servo-motor and said indicator thereby, said amplifier having means including an input transformer operating at substantially maximum flux density and permeability at low signal strengths, said input transformer saturating as the signal level increases, and diode voltage limiting means connected across the primary of said input transformer.

13. In a condition indicator adapted to be mounted on a panel, the combination including a casing having means for mounting the same on a panel or the like, a servomechanism driven indicator in said casing, a synchro-transformer having a rotor in said casing from which an error signal can be produced in response to a change in condition, a two phase servo-motor mechanically connected to the rotor of said synchro-transformer and to said indicator, an electronic amplifier in said casing electrically connected between said synchro-transformer and said servo-moto for amplifying an error signal from said synchro-transformer and operating said servo-motor and said indicator thereby, said amplifier having means including an input transformer operating at substantially maximum flux density and permeability at low signal strengths, said input transformer saturating as the signal level increases, reactance elements connected in series in the primary of said input transformer and parallel connected reactance elements in the secondary circuit, said elements and transformer characteristics being selected so that the rate of change of phase shift in the primary circuit is substantially equal and opposite to the rate of change of phase shift in the secondary circuit as the signal changes and a frame in said casing carrying said indicator, synchro-transformer, servo-motor and amplifier.

14. In a condition indicator adapted to be mounted on a panel, the combination including a hermetically sealed casing having means for mounting the same on a panel or the like, said casing having a length in the range of 4" to 6" and a diameter in the range of about 1¾" to 2", a servomechanism driven indicator in said casing, a synchro-transformer mechanism in said casing having a rotor from which an error signal can be produced in response to a change in condition of input to said synchro-transformer, a servo-motor mechanism mechanically connected to the rotor of said synchro-transformer and to said indicator by a gear train, a frame in said casing carrying said indicator and said mechanisms, damping means connectable to said gear train after initial movement thereof, an electronic amplifier having tube means in said casing electrically connected and being between said synchro-transformer mechanism and said servo-motor mechanism for amplifying an error signal from said synchro-transformer and operating said servo-motor mechanism and said indicator thereby, said amplifier including an input transformer having a high step-up ratio and operating above its saturation point upon increase in signal level above about .05 volt, movement carrying means holding said indicator and gear train, plate means upon which said amplifier is mounted, and heat dissipating means connected to said plate means and shielding said tube, said heat dissipating means also engaging one of said mechanisms holding said parts in assembled relationship with said frame.

15. In a condition indicator adapted to be mounted on a panel, the combination including a casing having means for mounting the same on a panel or the like, a driven indicator mounted in said casing, a synchro-transformer mounted in said casing and having a rotor from which an error signal can be produced in response to a change in condition, a servo-motor mounted in said casing and mechanically connected to the rotor of said synchro-transformer and to said indicator, electronic amplifier tube means having its output connected to said servo-motor for control thereof, a high step-up transformer connected to the output of said synchro-transformer and the input of said tube means, said step-up transformer being so constructed and arranged as to operate at substantially maximum flux density and maximum permeability with low signal strength, the step-up transformer becoming saturated upon increase in signal strength, phase shift increasing means in the primary circuit of said step-up transformer increasing the shift therein upon increase of signal strength, and phase shift decreasing means in the secondary circuit of said step-up transformer decreasing the shift therein upon increase of signal strength.

References Cited in the file of this patent
UNITED STATES PATENTS

| Number | Name | Date |
|---|---|---|
| 2,405,568 | Ferrill | Aug. 13, 1946 |
| 2,422,714 | Bigelow et al. | June 24, 1947 |
| 2,455,618 | Shepard | Dec. 7, 1948 |
| 2,477,673 | Weisman | Aug. 2, 1949 |
| 2,503,739 | Janssen | Apr. 11, 1950 |
| 2,531,492 | Angst et al. | Nov. 28, 1950 |
| 2,546,628 | Briggs | Mar. 27, 1951 |
| 2,586,010 | Divoll | Feb. 19, 1952 |
| 2,667,609 | Wolf | Jan. 26, 1954 |